United States Patent Office 3,454,401
Patented July 8, 1969

3,454,401
PHOTOGRAPHIC MATERIAL FOR THE SILVER
DYESTUFF BLEACHING PROCESS
Rudolf Mory, Dornach, Switzerland, assignor to Ciba
Limited, Basel, Switzerland, a Swiss company
No Drawing. Filed Feb. 2, 1965, Ser. No. 429,910
Claims priority, application Switzerland, Feb. 13, 1964,
1,701/64
Int. Cl. G03c 1/10, 5/52
U.S. Cl. 96—99     10 Claims

ABSTRACT OF THE DISCLOSURE

Photographic materials for the silver dyestuff bleaching process that contain on a support a layer having at least one dye stuff of the formula (1)    $R_1-N=N-R_2-N=N-R_3$

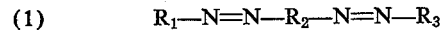

in which $R_1$ represents the radical of a 1-acylamino-8-hydroxynaphthalene - disulfonic acid bound to the azo group in 7-position, $R_2$ represents a benzene radical which is bound to the azo groups in 1:4-position and contains two alkoxy groups, one in 2-position and one in 5-position, and $R_3$ represents the radical of a hydroxynaphthalene-monosulfonic acid amide or a hydroxynaphthylsulfone bound to the azo group in a position vicinal to the hydroxyl group.

---

The present invention provides photographic material for the silver dyestuff bleaching process, which material contains a cyan dyestuff in a silver halide emulsion layer. Such a dyestuff must possess a wide range of properties: it must not reduce the sensitivity of the red-sensitized emulsion; it must not diffuse into the support layer or into the magenta layer; it must be easily and completely bleachable in the bleaching bath; it must be fast to light, and it must meet certain spectral requirements.

The present invention is based on the observation that dyestuffs of the following formula meet these requirements to a large extent. Accordingly, the present invention provides photographic materials for the silver dyestuff bleaching process that contain on a support a layer having at least one dyestuff of the formula (1)    $R_1-N=N-R_2-N=N-R_3$

in which $R_1$ represents the radical of a 1-acylamino-8-hydroxynaphthalene-disulfonic acid bound to the azo group in 7-position, $R_2$ represents a benzene radical which is bound to the azo groups in 1:4-position and contains two alkoxy groups, one in 2-position and one in 5-position, and $R_3$ represents the radical of a hydroxynaphthalene-monosulfonic acid amide or a hydroxynaphthyl-sulfone bound to the azo group in a position vicinal to the hydroxyl group.

Dyestuffs of the kind defined can be prepared, for example, by diazotizing a 1-amino-2:5-dialkoxy-4-nitrobenzene, for example, 1-amino-2:5diethoxy-4-nitrobenzene, or a 1-amino-4-nitrobenzene that contains a methoxy group in the 2- or 5-position and an ethoxy group in the other of these two positions, but preferably 1-amino-2:5-dimethoxy-4-nitrobenzene, coupling the diazo compound with a 1 - acylamino - 8 - hydroxynaphthalene - disulfonic acid, reducing the nitrazo dyestuff, diazotizing the aminoazo dyestuff, and coupling the diazo-azo compound with a hydroxynaphthalene-monosulfonic acid amide or hydroxynaphthylsulfone that couples in a position vicinal to the hydroxyl group.

Suitable 1-acylamino-8-hydroxynaphthalene-disulfonic acids are, for example, 1-acylamino-8-hydroxy-naphthalene-4:6-disulfonic acids and especially 1-acylamino-8-hydroxynaphthalene-3:6-disulfonic acids. The acylamino group in 1-position may be derived, for example, from an aliphatic carboxylic acid, for example, propionic acid or acetic acid, but especially from an acid of the benzene series, for example, benzoic acid, benzene-sulfonic acid or para-toluene sulfonic acid. In this case, the acylamino group corresponds to the formula $R_4-Y-NH-$, in which $R_4$ represents a monocyclic benzene radical and Y represents an $-SO_2-$ group or preferably a $-CO-$ group. Accordingly, examples of 1-acylamino-8-hydroxynaphthalene-disulfonic acids are 1-acetylamino-, 1-benzoylamino- and 1-para-toluenesulfonylamino-8-hydroxynaphthalene-3:6-disulfonic acid.

The hydroxynaphthalene-monosulfonic acid amides and hydroxynaphthylsulfones to be coupled with the diazo-azo compounds must be capable of coupling in a position vicinal to the hydroxyl group and may contain the hydroxyl group in α-position or preferably in β-position. Thus, for example, 1-hydroxynaphthalene-3-sulfonic acid amides, 2-hydroxynaphthalene-6-sulfonic acid amides and especially 2-hydroxynaphthalene-7-sulfonic acid amides and the corresponding hydroxynaphthylsulfones are used. Substances worthy of special mention are the 2-hydroxynaphthalene-7-sulfonic acid amides of the formula (2)

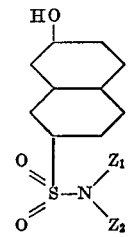

in which $Z_1$ represents a hydrogen atom or an alkyl group that may be further substituted, for example, a methyl, an ethyl, an n-propyl, an isopropyl, a hydroxyethyl or a methoxy propyl group, and $Z_2$ represents a hydrogen atom, an alkyl group that may be further substituted, an aryl radical, for example, a naphthyl radical or preferably a phenyl radical, or a cycloalkyl radical, for example, a cyclohexyl radical, in which formula $Z_1$ and $Z_2$, together with the nitrogen atom, may also form a heterocyclic ring, for example, a morpholine ring or a piperidine ring. The following compounds are examples:

1-hydroxynaphthalene-3-sulfonic acid-methoxypropyl-amide,
2-hydroxynaphthalene-6-sulfonic acid-methoxypropyl-amide,
2-hydroxynaphthalene-7-sulfonic acid-methoxypropyl-amide,
2-hydroxynaphthalene-7-sulfonic acid-phenylamide,
2-hydroxynaphthalene-7-sulfonic acid-cyclohexylamide,
2-hydroxynaphthalene-7-sulfonic acid-methylamide,
2-hydroxynaphthalene-7-sulfonic acid-dimethylamide,
2-hydroxynaphthalene-7-sulfonic acid-isopropylamide, 2-hydroxynaphthalene-7-sulfonic acid-morpholide,
2-hydroxynaphthalene-7-sulfonic acid-ethylamide,
2-hydroxynaphthalene-7-sulfonic acid amide,
2-hydroxynaphthalene-7-sulfonic acid-hydroxyethylamide, and
2-hydroxynaphthyl-(7)-benzylsulfone.

As is evident from the foregoing, the preferred dyestuffs for the photographic materials of the invention are those of the formula (3) 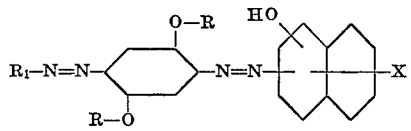

especially the dyestuffs of the formula (4) 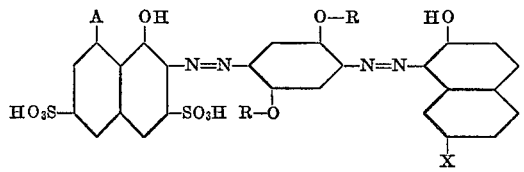

and, of this group, those of the formula (5) 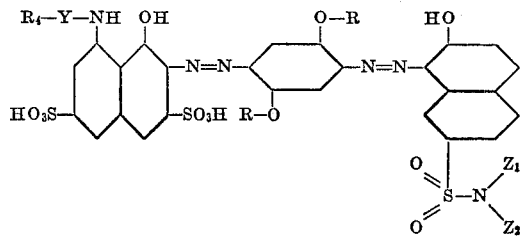

In these formulae, $R_1$, $R_4$, $Z_1$ and $Z_2$ have the meanings given above, X represents a sulfonic acid amide group or a benzylsulfone group, R represents an alkyl radical containing not more than 2 carbon atoms, and A represents an acylamino group.

A suitable method of preparing dyestuffs of the kind defined has already been indicated, and the various reactions may be carried out in the customary manner. For example, the first coupling reaction is advantageously carried out in a slightly alkaline medium, for example, in a medium containing sodium carbonate or sodium borate, reduction of the nitro compound to the amino compound is advantageously carried out with sodium sulfide in a strongly alkaline medium, and the second coupling reaction is carried out in a slightly alkaline medium in the presence of a substance that assists coupling, for example, pyridine or picoline.

The main difference between the dyestuffs of the invention and similar known dyestuffs is that the former display a very low degree of absorption in the blue range of the spectrum. They do not diffuse into the colorless support layer nor do they diffuse into the magenta layer disposed above. They bring about only a very slight decrease in the sensitivity of a red-sensitized silver bromide emulsion. They are fast to light and are not even attacked by chromium-containing oxidation baths as used in the reversal-reversal process. They can be bleached to a pure white in the usual acid dyestuff bleaching baths, and the intermediate tones of lower color density that are obtained when only a portion of the dyestuff is bleached are of the same spectral purity as the unbleached dyestuff; in particular, the color of the said intermediate tones is not shifted towards the blue-violet range. Furthermore, the color and intensity of images produced with these dyestuffs are less dependent on changes in pH than is the case with images produced with similar dyestuffs. The dyestuffs of the invention can be very easily bleached, even when in the lowest layer of multilayer material, and yield images having a flat, straight gradation. In the form of the alkali metal salts the dystuffs are readily soluble in water and produce only a slight increase in viscosity when added to a silver salt emulsion in gelatine. They are thus eminently suitable for incorporation in the red-sensitized silver bromide-gelatine emulsion layer at the bottom of multilayer material, especially for colored images to be viewed in incident light.

The following example illustrates the invention. Unless otherwise stated, the parts and percentages are by weight.

EXAMPLE

A solution of 10 mg. of a dyestuff of the formula (6) 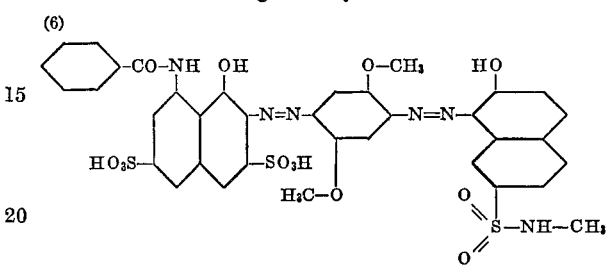

in 1.4 ml. of water is homogeneously mixed at 40° C. with 3.3 ml. of a 6% gelatine solution, 2 ml. of a 1% solution of 2-phenylamino-4:6-dichloro-1:3:5-triazine-4'-sodium sulfonate and 3.3 ml. of a silver bromide-silver iodide emulsion containing 83 grams of gelatine and 23 grams of silver per kilogram. The mixture is cast on a glass plate measuring 13 cm. x 18 cm. The dried layer is exposed behind a stepped wedge, and the silver image is developed in a 1-methylamino-4-hydroxybenzene developer and fixed. The image dyestuff is then bleached out, depending on the amount of silver present, in a bath that contains, per 1000 parts by volume, 100 parts of potassium bromide, 10 parts of thiourea, 70 parts by volume of hydrochloric acid of 37% strength, and 0.003 part of 2-amino-3-hydroxyphenazine. Excess silver is then removed in a bath that contains per 1000 parts by volume, 100 parts of sodium chloride, 100 parts of crystalline copper sulfate and 50 parts by volume of hydrochloric acid of 37% strength, whereupon fixation is carried out in the customary manner. A cyan wedge is obtained that constitutes the opposite image of the silver wedge orginally used and that is bleached pure white at areas where the silver was originally most dense. A cyan image of this nature can also constitute a part of multicolor material.

The dyestuff of the Formula 6 can be prepared as follows:

39.6 parts of 1-amino-2:5-dimethoxy-4-nitrobenzene are diazotized at 0° C. in the usual manner with hydrochloric acid and sodium nitrite. The clear diazo solution is coupled with a solution of 84.6 parts of 1-benzoylamino-8-hydroxynaphthalene-3:6-disulfonic acid in 1000 parts by volume of water in the presence of an excess of sodium borate. Coupling begins quickly and is completed by stirring the reaction mixture for several hours at room temperature. The nitroazo dyestuff precipitates in the form of small pale violet needles. It is isolated by suction filtration and then thoroughly pressed. The dyestuff is then stirred into 2000 parts by volume of water, rendered alkaline, and then reduced to the aminoazo dyestuff at 40 to 50° C. in the course of half an hour with 50 parts of sodium sulfide of 62% strength. The aminoazo dyestuff is precipitated with sodium bicarbonate and sodium chloride, isolated by filtration and then purified by reprecipitation from a boiling and filtered aqueous solution using sodium chloride.

6 parts of the aminomonoazo dyestuff so obtained, or an equivalent salt-containing amount thereof, are diazotized with hydrochloric acid and sodium nitrite and then coupled with 2.37 parts of 2-hydroxynaphthalene-7-sulfonic acid monomethylamide in a medium made alkaline with sodium carbonate in the presence of picoline. The dyestuff is then purified by repeated reprecipitation with sodium acetate in aqueous solution and then carefully washed with ethanol until free from salt.

The 2-hydroxynaphthalene-7-sulfonic acid-monomethylamide used in the second coupling reaction is obtained by carbethoxylating 2 - hydroxynaphthalene - 7 - sulfonic acid, preparing the sulfonic acid chloride with the aid of phosphorus pentachloride or with thionyl chloride in the presence of dimethylformamide, condensing the chloride with monomethylamine, and subsequently splitting off the carbethoxy residue with dilute sodium hydroxide solution. It melts at 130 to 132° C.

In addition to the dyestuff of Formula 6 a number of further dyestuffs and their absorption maxima are listed in the following table. Cyan layers for the silver dyestuff bleaching process and color images can be produced with these dyestuffs by the above process. The dyestuffs themselves can also be produced by the process described above. The 1-acylamino-8-hydroxynaphthalene disulfonic acid listed in column I as first coupling component is coupled with the diazo compound of the amine listed in column II, the nitroazo dyestuff is reduced to the aminoazo dyestuff, and this is followed by diazotization and coupling with the hydroxynaphthalene sulfonic acid amide or sulfone listed in column III as second component. The absorption maxima listed in column IV in mμ are determined by measuring gelatine layers containing 3 mg./dm.² of dyestuff in a Hardy spectrophotometer.

in which $R_1$ represents the radical of a 1-acylamino-8-hydroxynaphthalene disulfonic acid bound to the azo group in 7-position, $R_2$ represents a benzene radical which is bound to the azo groups in 1:4-position and contains two alkoxy groups, one in 2-position and the other in 5-position, and $R_3$ represents a radical selected from the group consisting of a hydroxynaphthalene-monosulfonic acid amide and a hydroxynaphthylsulfone, $R_3$ being bound to the azo group in a position vicinal to the hydroxyl group.

2. Photographic material for the silver dyestuff bleaching process that contains on a support a silver halide gelatine emulsion layer having at least one dyestuff of the formula

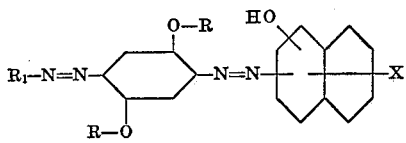

in which $R_1$ represents the radical of a 1-acylamino-8-hydroxynaphthalene-disulfonic acid bound to the azo-group in 7-position, each R represents an alkyl radical containing at most 2 carbon atoms, X represents a member

| No. | I<br>1st Coupling Component | II<br>Diazo Compound of | III<br>2nd Coupling Component | IV<br>$\lambda_{max}$ |
|---|---|---|---|---|
| 1 | 1-benzoylamino-8-hydroxynaphthalene-3:6-disulfonic acid. | 1-amino-2:5-dimethoxy-4-nitrobenzene. | 2-hydroxynaphthalene-7-sulfonic acid-methylamide. | 610 |
| 2 | do | do | 2-hydroxynaphthalene-7-sulfonic acid-methoxypropylamide. | 608 |
| 3 | do | 1-amino-2:5-diethoxy-4-nitrobenzene. | do | 594 |
| 4 | do | 1-amino-2:5-dimethoxy-4-nitrobenzene. | do | 608 |
| 5 | do | do | 2-hydroxynaphthalene-7-sulfonic acid amide. | 605 |
| 6 | do | do | 2-hydroxynaphthalene-7-sulfonic acid-ethylamide. | 607 |
| 7 | do | do | 2-hydroxynaphthalene-7-sulfonic acid phenylamide. | 600 |
| 8 | do | 1-amino-2:5-diethoxy-4-nitrobenzene. | 2-hydroxynaphthalene-7-benzylsulfone. | 610 |
| 9 | do | do | 2-hydroxynaphthalene-7-sulfonic acid-hydroxyethylamide. | 590 |
| 10 | do | do | 2-hydroxynaphthalene-7-sulfonic acid amide. | 590 |
| 11 | do | do | 2-hydroxynaphthalene-7-sulfonic acid-ethylamide. | 590 |
| 12 | do | do | 2-hydroxynaphthalene-7-sulfonic acid morpholide. | 620 |
| 13 | do | do | 1-hydroxynaphthalene-3-sulfonic acid methoxypropylamide. | 665 |
| 14 | do | do | 2-hydroxynaphthalene-6-sulfonic acid methoxypropylamide. | 583 |
| 15 | do | 1-amino-2:5-dimethoxy-4-nitrobenzene. | do | 585 |
| 16 | 1-para-toluenesulfonyl-amino-8-hydroxynaphthalene-3:6-disulfonic acid. | do | 2-hydroxynaphthalene-7-sulfonic acid dimethylamide. | 608 |
| 17 | do | do | 2-hydroxynaphthalene-7-sulfonic acid morpholide. | 605 |
| 18 | do | do | 2-hydroxynaphthalene-7-sulfonic acid phenylamide. | 660 |
| 19 | do | do | 2-hydroxynaphthalene-7-sulfonic acid cyclohexylamide. | 625 |
| 20 | do | do | 2-hydroxynaphthalene-7-sulfonic acid methylamide. | 624 |
| 21 | do | do | 2-hydroxynaphthalene-7-sulfonic acid isopropylamide. | 640 |
| 22 | do | do | 2-hydroxynaphthalene-7-benzylsulfone. | 625 |
| 23 | 1-acetylamino-8-hydroxynaphthalene-3:6-disulfonic acid. | do | do | 603 |
| 24 | 1-benzoylamino-8-hydroxynaphthalene-4:6-disulfonic acid. | do | 2-hydroxynaphthalene-7-sulfonic acid amide. | 615 |
| 25 | do | do | 2-hydroxynaphthalene-7-sulfonic acid methylamide. | 610 |

What is claimed is:

1. Photographic material for the silver dyestuff bleaching process that contains on a support a silver halide gelatine emulsion layer having at least one dyestuff of the formula $$R_1-N=N-R_2-N=N-R_3$$

selected from the group consisting of a sulfonic acid amide group and a benzylsulfone group, and the hydroxyl group bound to the naphthalene ring which is further substituted by X is in a position vicinal to the azo group.

3. Photographic material for the silver dyestuff bleaching process that contains on a support a silver halide gelatine emulsion layer having at least one dyestuff of the formula

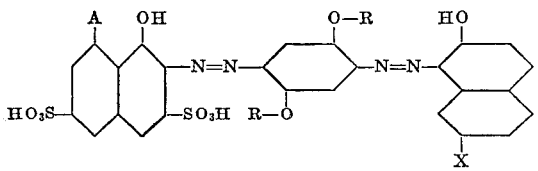

in which A represents an acylamino group containing a benzene ring, R represents an alkyl group containing at most 2 carbon atoms, and X reperesents a benzylsulfone group.

4. Photographic material for the silver dyestuff bleaching process that contains on a support a silver halide gelatine emulsion layer having at least one dyestuff of the formula

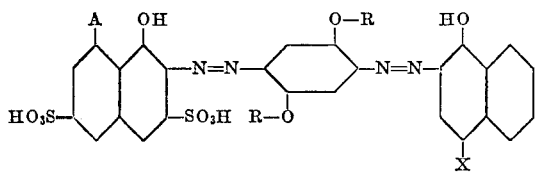

in which A represents an acylamino group containing a benzene ring, R represents an alkyl group containing at most 2 carbon atoms, and X represents a sulfonic acid amide group.

5. Photographic material for the silver dyestuff bleaching process that contains on a support a silver halide gelatine emulsion layer having at least one dyestuff of the formula

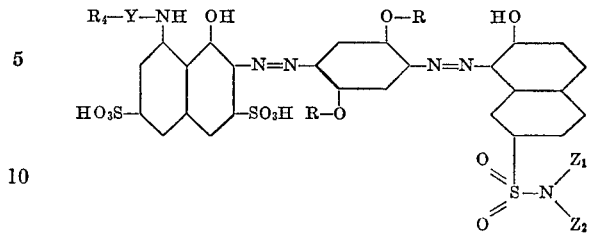

in which $R_4$ represents a monocyclic benzene radical, Y represents a member selected from the group consisting of an —$SO_2$— group and a —CO— group, R represents an alkyl group containing at most 2 carbon atoms, $Z_1$ represents a member selected from the group consisting of a hydrogen atom, an alkyl group, a hydroxyalkyl group, an alkoxyalkyl group and, together with N and $Z_2$, a heterocyclic ring, and $Z_2$ represents a member selected from the group consisting of a hydrogen atom, an alkyl group, a hydroxyalkyl group, an alkoxyalkyl group, a benzene radical, a cyclohexyl radical and, together with N and $Z_1$, a heterocyclic ring.

6. Photographic material for the silver dyestuff bleaching process that contains on a support a silver halide gelatine emulsion layer having the dyestuff of the formula

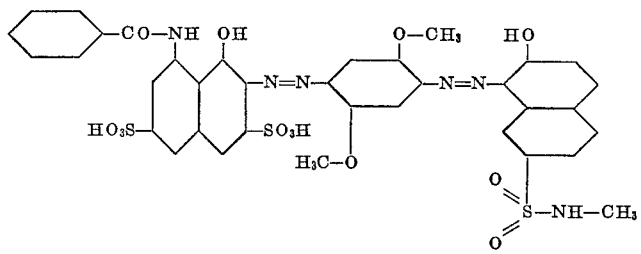

7. Photographic material for the silver dyestuff bleaching process that contains on a support a silver halide gelatine emulsion layer having the dyestuff of the formula

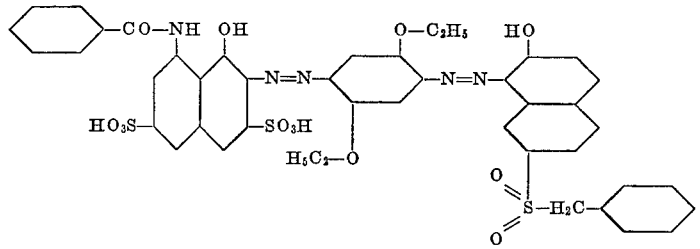

8. Photographic material for the silver dyestuff bleaching process that contains on a support a silver halide gelatine emulsion layer having the dyestuff of the formula

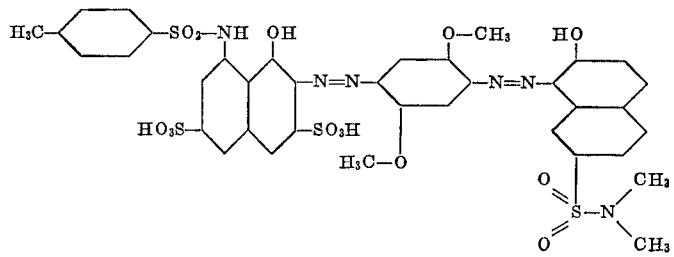

9. Photographic material for the silver dyestuff bleaching process that contains on a support a silver halide gelatine emulsion layer having the dyestuff of the formula

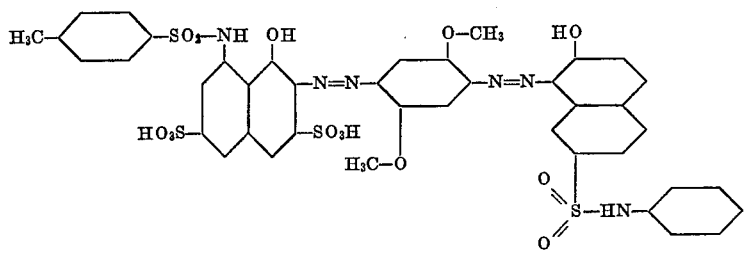

10. Photographic material for the silver dyestuff bleaching process that contains on a support a silver halide gelatine emulsion layer having the dyestuff of the formula

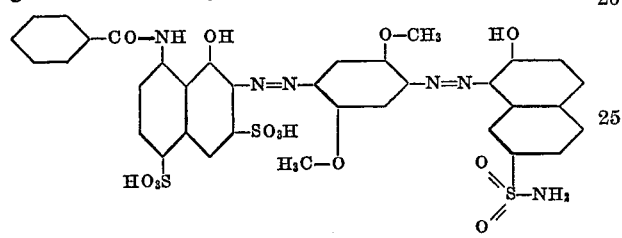

References Cited

UNITED STATES PATENTS

| | | | |
|---|---|---|---|
| 2,856,397 | 10/1958 | Pfitzner et al. | 260—151 |
| 3,157,508 | 11/1964 | Dreyfuss | 96—99 |
| 3,287,132 | 11/1966 | Hunt | 96—99 |

J. TRAVIS BROWN, *Primary Examiner.*

CASE TEL-9/E

PO-1050
(5/69)

UNITED STATES PATENT OFFICE
CERTIFICATE OF CORRECTION

Patent No. 3,454,401  Dated July 8, 1969

Inventor(s) RUDOLF MORY

It is certified that error appears in the above-identified patent and that said Letters Patent are hereby corrected as shown below:

Column 7, lines 20 to 25, amend the right hand side of the formula to read:

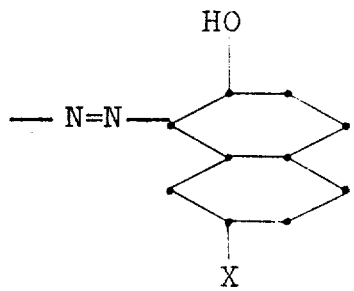

Signed and sealed this 25th day of May 1971.

(SEAL)
Attest:

EDWARD M. FLETCHER, JR.
Attesting Officer

WILLIAM E. SCHUYLER, JR.
Commissioner of Patents